United States Patent [19]
Gust et al.

[11] Patent Number: 6,145,455
[45] Date of Patent: Nov. 14, 2000

[54] AGRICULTURAL MATERIAL METERING SYSTEM

[75] Inventors: Jacob Gust; Bradley J. Meyer, both of Fargo, N. Dak.

[73] Assignee: Case Corporation, Racine, Wis.

[21] Appl. No.: 09/271,005

[22] Filed: Mar. 17, 1999

[51] Int. Cl.$^7$ .............................. B67D 5/08; A01C 19/02
[52] U.S. Cl. .......................... 111/178; 111/921; 111/922; 111/200; 222/263; 222/334; 222/318
[58] Field of Search ..................... 111/921, 922, 111/904, 903, 200, 177, 178, 183, 170; 701/50; 222/254, 263, 268, 267, 283, 310, 311, 318, 334, 63

[56] References Cited

U.S. PATENT DOCUMENTS

| | | | |
|---|---|---|---|
| 2,525,718 | 10/1950 | Parker | 222/11 |
| 2,955,877 | 10/1960 | Ecal . | |
| 3,172,566 | 3/1965 | Mullin et al. | 222/263 X |
| 3,189,230 | 6/1965 | Gillespie | 222/193 |
| 3,258,162 | 6/1966 | Beasely | 222/41 |
| 3,482,735 | 12/1969 | Goulter | 221/211 |
| 3,511,411 | 5/1970 | Weiss | 111/921 X |
| 3,806,280 | 4/1974 | Bobier . | |
| 3,889,850 | 6/1975 | Whitt | 222/263 X |
| 4,286,530 | 9/1981 | Conley | 414/526 X |
| 4,473,016 | 9/1984 | Gust | 222/263 X |
| 4,503,786 | 3/1985 | Tautfest | 111/86 |
| 4,505,405 | 3/1985 | Kelly et al. | 222/334 X |
| 4,519,525 | 5/1985 | Wunschl et al. | 221/211 |
| 4,562,968 | 1/1986 | Widmer et al. | 239/655 |
| 4,682,710 | 7/1987 | Turner, Jr. et al. | 222/263 X |
| 4,710,107 | 12/1987 | Kanies | 417/269 |
| 4,919,303 | 4/1990 | Boudreault | 222/1 |
| 4,926,768 | 5/1990 | Magda | 111/178 X |
| 5,025,951 | 6/1991 | Hook et al. | 111/177 X |
| 5,379,706 | 1/1995 | Gage et al. | 111/175 |
| 5,598,794 | 2/1997 | Hamrs et al. | 111/177 |
| 5,601,209 | 2/1997 | Barsi et al. | 221/266 |
| 5,632,212 | 5/1997 | Barry | 111/200 |

OTHER PUBLICATIONS

Wil–Rich—*Air Master Q110 Q160* Aug. 1995.
Case—Air Systems—*Air Seeders and Bulk Handling* 1996.
Case—Concord—*Air Till Drill Systems* 1996.
Case—Concord—*Precision Farm Equipment* 1996.
1995 ASA Annual International Meeting—Hyatt Regency Chicago, Chicago, Illinois, Jun. 18–23, 1995—*The Terranova VRS Variable Rate System*.

*Primary Examiner*—Christopher J. Novosad
*Attorney, Agent, or Firm*—Foley & Lardner

[57] ABSTRACT

An agricultural material metering system includes a metering member, a hydraulically driven actuator, a pump, a rotatable ground driven member, a variable drive control and an actuator coupled to the variable drive control. The metering member is configured to meter agricultural material upon being driven. The hydraulically driven actuator is coupled to the metering member to drive the metering member. The variable drive control is coupled between an inlet of the pump and the metering member and is configured for actuation between a first position in which the hydraulically driven actuator drives the metering member at a first rate and a second position in which the hydraulically driven actuator drives the metering member at a second rate. The rotatable ground driven member is coupled to the pump and drives the pump when rotating. The pump is coupled to the hydraulically driven actuator and displaces fluid upon being driven to drive the hydraulically driven actuator. The actuator coupled to the variable drive control is configured to actuate the variable drive control between the first and second positions to vary the rate in which materials metered by the metering member. One exemplary embodiment, the variable drive control is incorporated into the pump, wherein the pump comprises a variable displacement pump. In another embodiment, the variable drive control is incorporated into the hydraulically driven actuator such that hydraulically driven actuator comprises a variable displacement hydraulic motor.

40 Claims, 7 Drawing Sheets

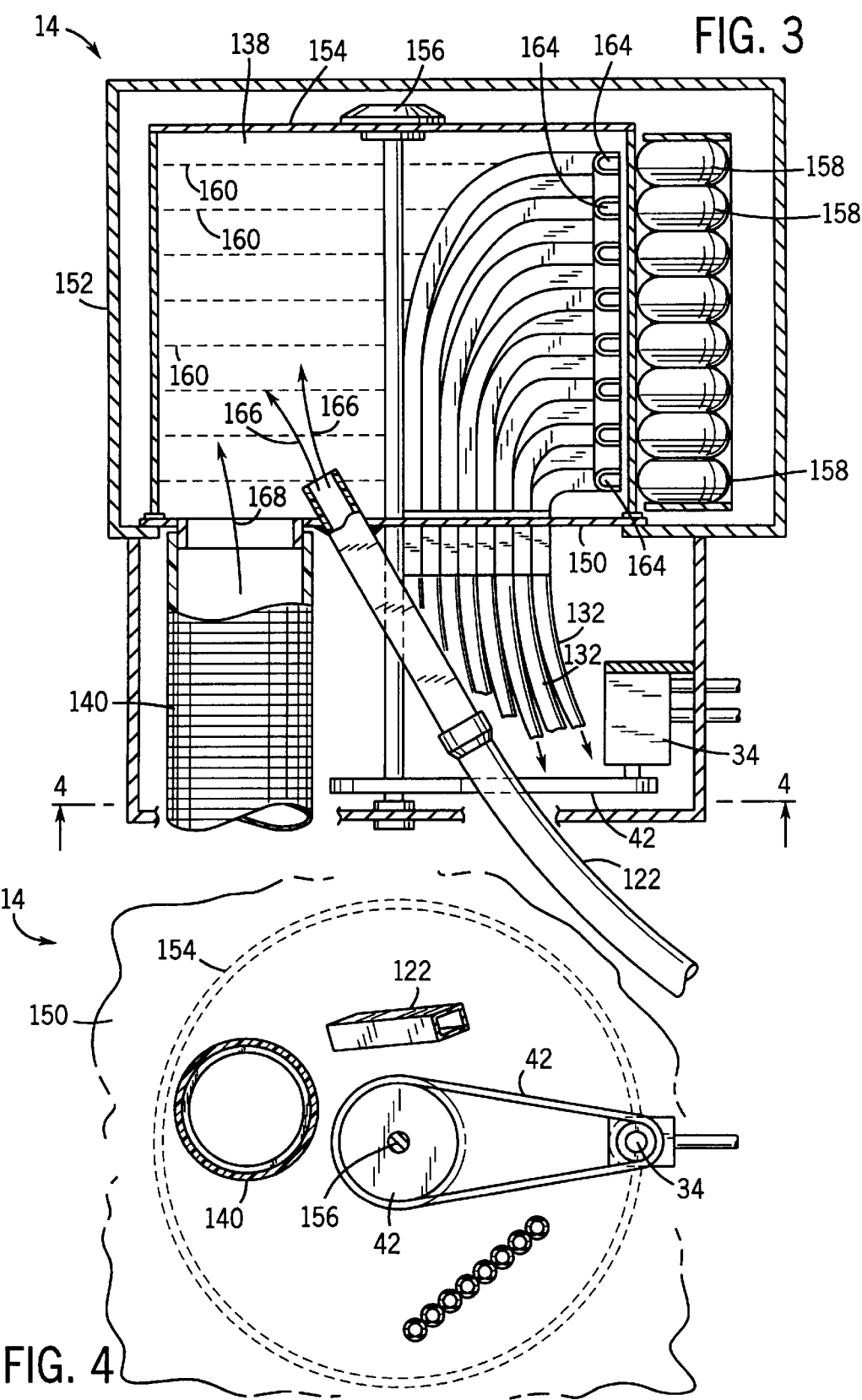

AGRICULTURAL MATERIAL METERING SYSTEM

FIELD OF THE INVENTION

The present invention relates to agricultural metering systems used for metering agricultural material such as seed, fertilizer, insecticide or herbicide. In particular, the present invention relates to mechanisms for driving rotatable metering members.

BACKGROUND OF THE INVENTION

Agricultural metering systems are used to meter and dispense a wide variety of agricultural materials including seed, fertilizer, insecticide and herbicide, to a growing medium such as soil. Although generally in dry particulate form, some agricultural materials such as fertilizer, herbicide and insecticide are also in liquid form. Regardless of the particular form in which the agricultural material has, it is critical that the material be accurately and consistently dispensed and metered to the growing medium to insure maximum crop yield at the lowest cost.

A wide variety of agricultural material metering systems are generally available depending upon the type and form of material being metered and the desired metering accuracy and consistency. Such metering systems typically include a rotatable metering member which meters the agricultural material upon being rotated. To meter dry particulate material such as seed, fertilizer, insecticide or herbicide, such rotatable metering members typically include a detent such as a depression, hole or groove, which segregates and carries a distinct amount of material through a tube or other passage for delivery to the growing medium.

For example, Cyclo metering systems are typically used to meter and dispense seed. Cyclo metering systems typically includes a rotatable drum which receives seed from a hopper, wagon or cart and which meters the material into a furrow created by a ground engaging tool. The drum includes a plurality of openings which receive and carry the seed to seed delivery tubes as the drum is rotated. To insure consistent results, the interior of the drum is pressurized by a fan or blower to hold individual seeds against the openings as the drum is rotated. When the openings are closed off above the seed tubes, the seeds fall from the openings into the corresponding seed tubes for delivery to the growing medium.

A second type of agricultural material metering system is the plate seeder. Conventional plate seeders include a rotatable plate having a plurality of openings therethrough about its outer perimeter. With such plate systems, seeds are delivered to a first side of the plate while a fan or blower creates a vacuum on a second opposite side of the plate. This vacuum draws and retains individual seeds in the openings against the plate. During rotation, the plate carries the seeds to locations above seed delivery tubes where the vacuum is broken such that the seeds fall out of the holes into the tubes for delivery to the growing medium.

A third type of agricultural material metering system are cylindrical wheels or flutes. Such wheels or flutes are commonly used on carts on air seeding implements. The flutes are typically located at the bottom of a material compartment and are fed material by gravity. The material generally flows past an adjustable sliding panel or gate and is metered by the flute into an air tube for delivery directly to a growing medium or for delivery to a secondary metering system. The flutes typically include a plurality of axially extending teeth or grooves sized to carry and meter the agricultural material at a generally precise rate dependent upon the rate at which the flute is rotated.

Whether a drum, a plate or a flute, such rotatable metering members must each be rotatably driven to meter agricultural material. As a result, many of these systems employ mechanical ground drives which are mounted on the implement main frame. The ground drives typically include a ground engaging wheel and a mechanical drive train consisting of one or more chains and sprockets extending between the ground engaging wheel and a lengthy drive shaft connected to each of the rotatable metering members. Although commonly used, such mechanical ground drives have several associated drawbacks. Because the mechanical drive train is directly connected to the rotatable metering member, adjusting the location of the rotatable metering member to accommodate different row spacings is difficult if not impossible. Moreover, with such mechanical drive trains used to rotate rotatable metering members, different metering rates require multiple sprockets which occupy valuable space, which are subject to breakage and wear and which increase the cost of the system. In addition, adjusting the rate at which material is metered requires one or more chains to be repositioned and connected to different sprockets. Such a procedure is inconvenient and time consuming. Because the implement must generally be stopped to enable one or more chains to be repositioned, such systems do not allow the operator to adjust the rate at which material is metered while crossing the field or on the go.

In lieu of using a mechanical ground drive to drive the shaft connected to each rotatable metering member, some systems have alternatively used a mechanical ground drive to drive a hydraulic pump to drive hydraulic motors connected to rotatable metering members. Although eliminating the lengthy drive shaft extending between multiple metering members, such systems additionally require an independent hydraulic system with an additional hydraulic reservoir. Sometimes, a hydraulic cooler must be added also, but the rate of the meters still changes as the temperature of the oil in the system increases. With most hydraulic components used on agricultural implements, their volumetric efficiency decreases with increase in oil temperature and hence application rates uncontrollably. This increases both the cost and complexity of the system. Moreover, to adjust the metering rate, such systems still require that the chain of the mechanical drive train be repositioned on a multi-sprocket transmission. As a result, these systems are extremely space consuming and expensive and cannot be adjusted on the go while crossing a field.

In recent years, agricultural material metering systems have been developed which allow the material metering rate to be adjusted on the go while crossing a field. Such systems typically omit mechanical ground drive assemblies and instead rely on electronics to control hydraulic systems for accurate metering. In particular, such systems typically include ground speed sensors, such as radar, to detect ground speed of the work vehicle pulling the implement carrying the metering system. This sensed ground speed is transmitted to the system's electronics which control a series of hydraulic pumps and valves to hydraulically drive a hydraulic motor connected to each rotatable metering member. To adjust the metering rate of the electronic system, the user simply enters in a new desired rate. Based upon the newly entered rate, the electronics controls the hydraulic system to adjust the hydraulic oil flow sent to the hydraulic motor to adjust the rate at which the rotatable metering member is rotated.

Although such systems enable the metering rate to be adjusted on the go, such electronic metering systems are extremely expensive to implement and are difficult to diagnose and repair when damaged. Moreover, as compared to ground driven mechanical metering systems, such electronic metering systems require an additional hydraulic circuit to drive the hydraulic motors connected to the rotatable metering members. This additional hydraulic circuit increases hydraulic requirements of the work vehicle or tractor and when connected to open center hydraulic systems, can cause overheating problems.

Thus, there is a continuing need for an agricultural material metering system that is inexpensive, that is adjustable on the move, that enables the metering member to be easily repositioned and that does not increase the hydraulic requirements of the work vehicle or tractor.

SUMMARY OF THE INVENTION

According to one embodiment, the present invention provides an agricultural material metering system including a metering member, a hydraulically driven actuator, a pump, a rotatable ground driven member, a variable drive control and an actuator coupled to the variable drive control. The metering member is configured to meter agricultural material upon being driven. The hydraulically driven actuator is coupled to the metering member to drive the metering member. The variable drive control is coupled between an inlet of the pump and the metering member and is configured for actuation between a first position in which the hydraulically driven actuator drives the metering member at a first rate and a second position in which the hydraulically driven actuator drives the metering member at a second rate. The rotatable ground driven member is coupled to the pump and drives the pump when rotating. The pump is coupled to the hydraulically driven actuator and displaces fluid upon being driven to drive the hydraulically driven actuator. The actuator coupled to the variable drive control is configured to actuate the variable drive control between the first and second positions to vary the rate in which materials metered by the metering member.

In one exemplary embodiment, the variable drive control is incorporated into the pump such that the pump is actuatable between a first position in which the pump displaces fluid at a first rate and a second position in which the pump displaces the fluid at a second rate. In another embodiment, the variable drive control is incorporated into hydraulically driven actuator such that hydraulically driven actuator is actuatable between a first position in which the hydraulically driven actuator drives the metering member at a first rate per unit of hydraulic power received from the pump and the second position in which the hydraulically driven actuator drives the metering member at a second rate per unit of hydraulic power received from the pump. In yet another embodiment, the variable drive control includes a valve fluidly coupled between the pump and the hydraulically driven actuator. The valve is moveable between a first position in which the valve transmits a first percentage of fluid displaced by the pump to the hydraulically driven actuator and a second position in which the valve transmits a second percentage of the fluid displaced by the pump to the hydraulically driven actuator.

According to a second embodiment, the present invention provides an agricultural material metering system including a rotatable metering member configured to meter agricultural material upon being rotated, a hydraulically driven rotary actuator coupled to the metering member to rotate the metering member, a variable displacement pump adapted to be fluidly coupled between a source of hydraulic fluid and the rotary actuator, a rotatable ground driven member coupled to the pump to drive the pump when rotating and an actuator coupled to the variable displacement pump. The variable displacement pump is actuatable between a first position in which the pump displaces fluid at a first rate and a second position in which the pump displaces fluid at a second rate. The actuator is configured to actuate the variable displacement pump between the first and second position to vary rotational velocity of the rotary actuator, vary the rotational velocity of the metering member and to vary rates at which material is metered.

According to a third embodiment, the present invention provides an agricultural material metering system which includes a hydraulic reservoir, a first hydraulic pump, a hydraulic circuit having a first portion extending from the reservoir to the pump and second portion extending from the pump to the reservoir, a hydraulically driven component coupled to the second portion of the circuit, a second pump coupled to the second portion of the circuit, a first hydraulically driven rotary actuator fluidly coupled to the second pump to receive fluid displaced by the second pump and a first rotatable metering member coupled to the rotary actuator and configured to meter agricultural material upon being rotated by the first hydraulically driven rotary actuator.

According to yet a fourth embodiment, the present invention comprises an agricultural material metering system for use with an implement having a hydraulically driven component and a hydraulic circuit having a first supply portion connected to the component and adapted to be fluidly coupled to a first pump of a work vehicle and a second return portion connected to the component and adapted to be connected to a fluid reservoir of the work vehicle. The metering system includes a second pump adapted to be coupled to the second portion of the circuit, a first hydraulically driven rotary actuator fluidly coupled to the second pump to receive fluid displaced by the second pump and the first rotatable metering member coupled to the first rotary actuator and configured to meter agricultural material upon being rotated by the first rotary actuator.

According to a fifth embodiment, the present invention provides a material metering implement for use with a work vehicle having a fluid reservoir and a fluid pump. The material metering implement includes a frame, a plurality of ground engaging members supporting the frame above the ground, a rotatable metering member coupled to the frame and configured to meter agricultural material upon being rotated, a hydraulically driven rotary actuator coupled to the metering member to rotate the metering member, a variable displacement pump adapted to be fluidly coupled between a source of hydraulic fluid and the rotary actuator, a rotatable ground driven member supported by the frame and coupled to the pump to drive the pump when rotating and an actuator coupled to the variable displacement pump. The variable displacement pump is actuatable between a first position in which the pump displaces fluid at a first rate and a second position in which the pump displaces fluid at a second rate. The actuator is configured to actuate the variable displacement pump between the first and second positions to vary the rotational velocity of the rotary actuator and thereby vary rotational velocity of the metering member and varying rates at which material is metered by the metering member.

BRIEF DESCRIPTION OF THE DRAWINGS

FIG. 3 is a sectional view of an individual meter of the agricultural material metering system of FIG. 1.

FIG. 4 is a sectional view of the meter of FIG. 3 taken lines 4—4.

DETAILED DESCRIPTION OF THE PREFERRED EMBODIMENTS

Figure 1:
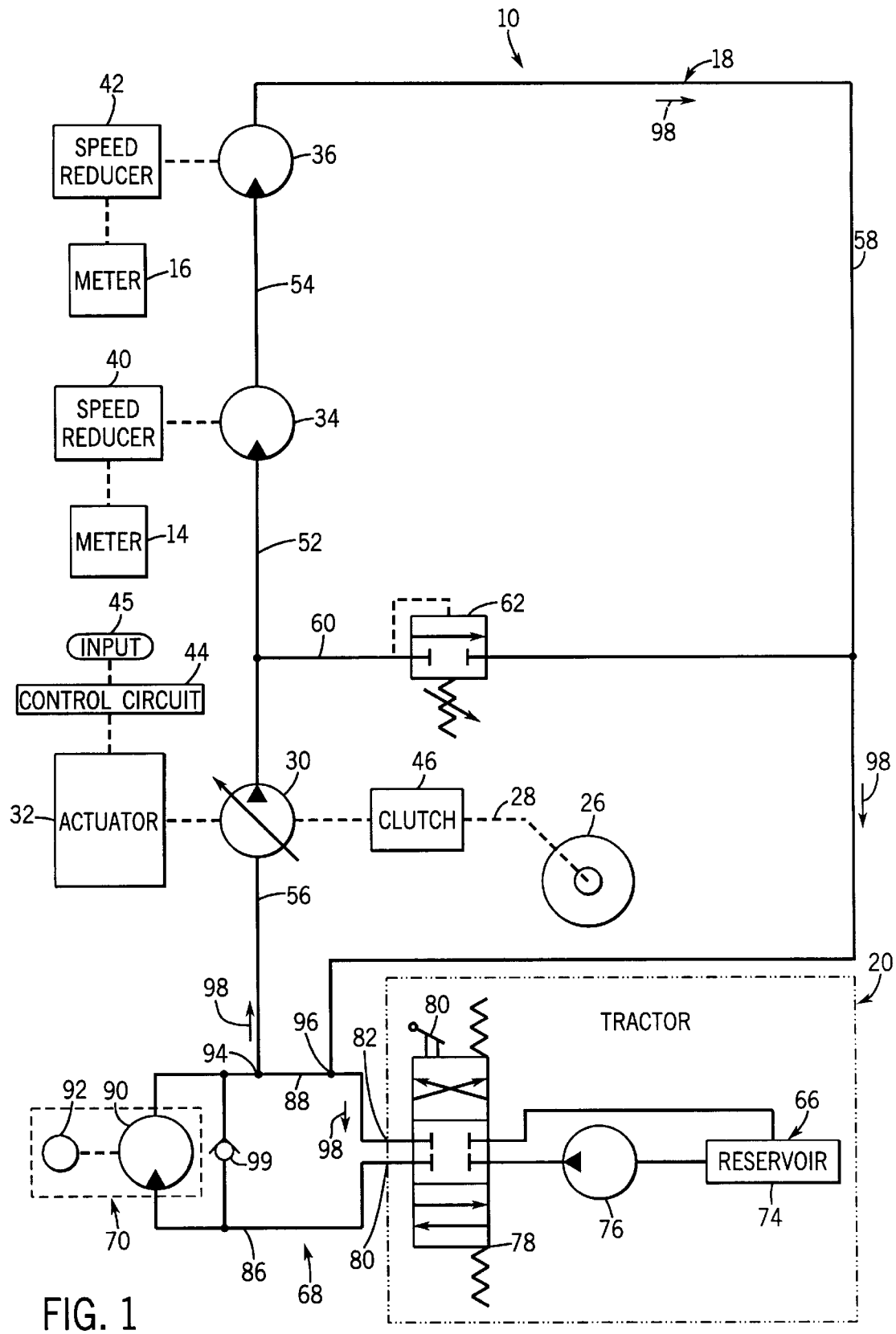
FIG. 1 is a schematic illustration of an agricultural material metering system including meters, a drive system and a hydraulic pressure source.

FIG. 1 is a schematic illustration of agricultural material metering system 10 which generally includes meters 14, 16, drive system 18 and hydraulic pressure source 20. Meters 14, 16 comprise conventionally known agricultural meters configured to meter agricultural particulate materials such as seed, dry herbicide, dry insecticide or dry fertilizer or configured to meter agricultural liquid materials such as liquid fertilizer, liquid herbicide or liquid insecticide. Meters 14 and 16 are supplied with such agricultural material by one or more material containers (not shown) which may comprise separately pulled wagons or carts or one or more hoppers or bins supported by an implement. Meters 14 and 16 preferably each include at least one rotatable metering member which is configured to meter agricultural material upon being rotated. In particular, each of meters 14 and 16 may comprise a conventionally known rotatable metering drum, a conventionally known rotatable plate or a conventionally known metering flute. As will be appreciated, the exact type and configuration of rotatable metering member employed by meters 14 and 16 will vary depending upon the type of agricultural material being metered and the necessary metering precision and accuracy. The rotatable metering members of meters 14 and 16 are each rotatably driven by drive system 18.

Drive system 18 generally includes ground driven member 26, transmission 28, variable displacement pump 30, actuator 32, hydraulically driven rotary actuators 34, 36, speed reducers 40, 42, control circuit 44 and input 45. Ground driven member 26 is configured for engaging the ground as the tractor, implement or wagon is pushed or pulled across the ground or growing medium. Ground driven member 26 preferably comprises a wheel and is coupled to pump 30 by transmission 28 to drive pump 30 when rotating or rolling across the ground.

Transmission 28 transmits torque from ground driven member 26 to pump 30. Transmission 28 preferably comprises a mechanical linkage comprising a chain-sprocket assembly between ground driven member 26 and pump 30. Alternatively, transmission 28 may comprise a belt-pulley assembly. Furthermore, transmission 28 may comprise other transmissions, whether mechanical, electrical, hydraulic or pneumatic, capable of transmitting power from ground driven member 26 to pump 30. Because transmission 28 merely transmits power from ground driven member 26 to pump 30 rather than meters 14 and 16, transmission 28 is shorter, less complex, less expensive and less prone to breakage.

To temporarily cessate the transmission of torque or power from ground driven member 26 to pump 30 as ground driven member is being pulled across a growing medium, transmission 28 additionally includes clutch 46. Clutch 46 is connected between ground driven member 26 and pump 30. Clutch 46 comprises a conventionally known clutch mechanism configured to selectively interrupt or allow the transmission of power from ground driven member 26 to pump 30. In the exemplary embodiment, clutch 46 comprises an electrically actuated clutch. Alternatively, clutch 46 may comprise a mechanically, pneumatically or hydraulically actuated clutch mechanism. Clutch 46 is connected to an electric control circuit such as a switch whereby clutch 46 is actuated between an engaged and disengaged position. Clutch 46 is preferably actuated between the engaged position and the disengaged position by a control circuit having operator controls at an operator control station of the work vehicle, such as in a cab of a tractor. In the engaged position, clutch 46 enables transmission 28 to transmit power from member 26 to pump 30. In the disengaged position, the power from member 26 to pump 30 is interrupted as ground driver member 26 is driven by the underlying ground.

Variable displacement pump 30 preferably comprises a conventionally known variable displacement piston pump configured to displace fluid at various selected rates. Pump 30 is driven by ground driven member 26 and is fluidly or hydraulically coupled to a source of hydraulic fluid, such as fluid source 20. When clutch 46 is in the engaged position, pump 30 is driven at a rate proportional to the rate at which metering system 10 is being moved across the growing medium or ground. Pump 30 displaces the hydraulic fluid from source 20 and pressurizes the fluid to drive rotary actuators 34 and 36. The rate at which pump 30 displaces fluid is varied by actuator 32.

Actuator 32 is coupled to pump 30 and is configured to move or actuate pump 30 between at least a first position in which pump 30 displaces fluid at a first rate and a second position in which pump 30 displaces fluid at a second rate. Actuator 32 is coupled to controls mounted to a tractor or alternatively the implement itself in a conventionally known manner. In the exemplary embodiment, pump 30 includes a swash plate which upon being angularly repositioned varies the rate at which pump 30 displaces fluid. Actuator 32 comprises an electric motor configured to angularly rotate and reposition the swash plate, preferably by a screw control, to vary the rate at which pump 30 displaces fluid to also vary the rate at which rotary actuators 34 and 36 are driven and to vary the rate at which the material is metered by meters 14 and 16.

Hydraulically driven rotary actuators 34 and 36 are fluidly or hydraulically coupled to pump 30 via hydraulic conduits or lines 52, 54 and are rotatably driven by the fluid displaced by pump 30. Rotary actuators 34 and 36 are conventionally known and are coupled to meters 14 and 16 so as to rotatably drive meters 14 and 16 to meter agricultural material.

In the exemplary embodiment, drive system 18 additionally includes speed reducers 40 and 42, also known as gear reduction units, operably disposed between rotary actuators 34 and 36 and meters 14 and 16, respectively. Speed reducers 40 and 42 are conventionally known and are configured to reduce the rotational velocity while increasing the torque being transmitted from rotary actuators 34 and 36 to meters 14 and 16, respectively. In the exemplary embodiment, speed reducers 40 and 42 have a five-to-one speed ratio. The ratio may vary depending upon pump 30, actuators 34 and 36 and the desired range of rotational velocities of the metering members of meters 14 and 16.

Control circuit 44 comprises conventional known electronic circuitry configured to generate control signals, whereby actuator 32 actuates pump 30 between multiple fluid displacement positions. Control circuit 44 generates the control signals based upon data or information provided by input 45.

Input 45 preferably comprises manual operator controls including an electrical switch. Such manual controls may additionally include an automatic mode wherein input 45 alternatively provides sensed real time data from sensors on the tractor or on one or more implements or location data from global positioning systems, commonly referred to as GPS, and/or storage data, whereby control circuit 44 generates the control signals to actuate actuator 32 and thereby pump 30 based on such information. In the exemplary embodiment, input 45 is located at an operator station of a tractor, such as in the cab of a tractor. As a result, the operator may adjust material application rates on the go from inside the tractor.

In operation, hydraulic fluid, such as oil, is supplied from source 20 to pump 30 via hydraulic line 56. As ground driven member is pulled or pushed across the growing medium in engagement with the growing medium, ground driven member 26 generates torque. When clutch 46 of transmission 28 is in the disengaged position, the transmission of torque from ground driven member 26 to pump 30 by transmission 28 is interrupted such that pump 30 does not displace fluid. Thus, to temporarily stop planting or to temporarily stop the application of fertilizer, insecticide or herbicide, as the planter, spreader, drill, sprayer or other implement is moved across the field, the operator simply disengages clutch 46.

In the engaged position, clutch 46 enables transmission 28 to transmit torque from ground engaging member 26 to pump 30 such that pump 30 is rotatably driven. As a result, pump 30 displaces hydraulic fluid which is transmitted to actuators 34 and 36 by hydraulic lines 52 and 54. The pressurized hydraulic fluid drives actuators 34 and 36 and returns to hydraulic fluid source 20 through hydraulic line 58. Upon being driven, actuators 34 and 36 rotatably drive rotatable metering members of meters 14 and 16. If hydraulic pressure within lines 52 and 54 substantially increase due to a malfunction associated with actuators 34, 36, speed reducers 40, 42 or meters 14, 16, the pressurized hydraulic fluid from line 52 is diverted or dumped to return line 58 through hydraulic line 60 and pressure release valve 62.

During planting, seeding or the application of fertilizer, herbicide or insecticide, it is frequently desirable to adjust the rate at which the particular agricultural material is being metered by meters 14 and 16 to the ground or other growing medium. Actuator 32 actuates pump 30 between multiple positions to vary the amount of fluid displaced by pump 30. By varying the amount of fluid displaced by pump 30, actuator 32 also varies the rotational velocity at which actuators 34 and 36 as well as meters 14 and 16 are driven. As a result, actuator 32 varies the rate at which the agricultural material is metered and delivered to the growing medium. Thus, to vary the seed population or the rate at which fertilizer, insecticide or herbicide is applied to the growing medium, the operator or other control means simply actuate actuator 32 to adjust pump 30.

Meter drive system 18 offers several advantages over the aforementioned conventional meter drive systems. Because ground driven member 26 drives pump 30, and ultimately meters 14 and 16 in proportion to the rate at which the ground driven member 26 and metering system 10 are being transported over and moved across the growing medium, metering system 10 and drive system 18 eliminate the need for relatively expensive ground speed sensors, such as radar, and other electronics necessary to detect ground speed of the working vehicle which are otherwise needed to ensure that the agricultural material is metered at a rate proportional to the rate at which the meter is being transported over the ground or growing medium. Eliminating the complex and expensive ground speed sensors and electronics also enables metering system 10 to be more easily diagnosed and repaired when damaged. Because transmission 28 operatively connects ground driven member 26 to pump 30 rather than each of meters 14, 16, and because the two metering units consisting of meter 14, actuator 34, speed reducer 40, and meter 16, actuator 36 and speed reducer 42, respectively, are simply connected to pump 30 by hydraulic line 52 and 54, which may comprise flexible hydraulic hosing, each metering unit is easily mounted to an implement and may be easily repositioned to accommodate various desired crop row spacings or application patterns. Because pump 30 comprises a variable displacement pump and because actuator 32 is configured to actuate pump 30 between various positions or states so as (a) to controllably vary the amount of fluid displaced by pump 30 (b) to controllably vary the rate at which actuators 34, 36 and meters 14, 16 are rotatably driven (c) to vary the rate at which material is metered, adjusting the planting rate or the rate at which fertilizer, insecticide or herbicide is metered and applied to the growing medium to simpler and less time consuming. In particular, drive system 18 enables the operator or an automated control to actuate pump 30 without having to reposition chains or belts relative to sprockets or pulleys. Because the controls of actuator 32 can be easily mounted at the operator station of the work vehicle, such as in the cab of a tractor, actuator 32 and the rate at which meters 14, 16 meter material can be adjusted on the go as metering system 10 is being moved across the field without the operator ever having the leave the operator station or cab of the tractor. In addition to enabling easier and quicker metering rate adjustments, metering system 10 eliminates the need for multiple pulley or multiple sprocket assemblies otherwise necessary to provide multiple metering rates. Consequently, drive system 18 and meter system 18 are also less space consuming.

Although drive system 18 is illustrated as being configured for driving two meters 14, 16, drive system 18 may have various other configurations and may be alternatively configured to drive a single meter or greater than two meters. Adding an additional meter or removing a meter simply requires hydraulically connecting an additional metering unit or hydraulically disconnecting and removing one of the metering units from pump 30. Furthermore, because drive system 18 includes a variable displacement pump 30 configured for actuation between various fluid displacement rates by actuator 32 to vary the rate at which actuators 34 and 36 drive meters 14 and 16, respectively, pump 30 and actuator 32 are relatively simple, compact and economical. Alternatively, other less desirable alternatives may be employed by drive system 18.

Figure 1A:
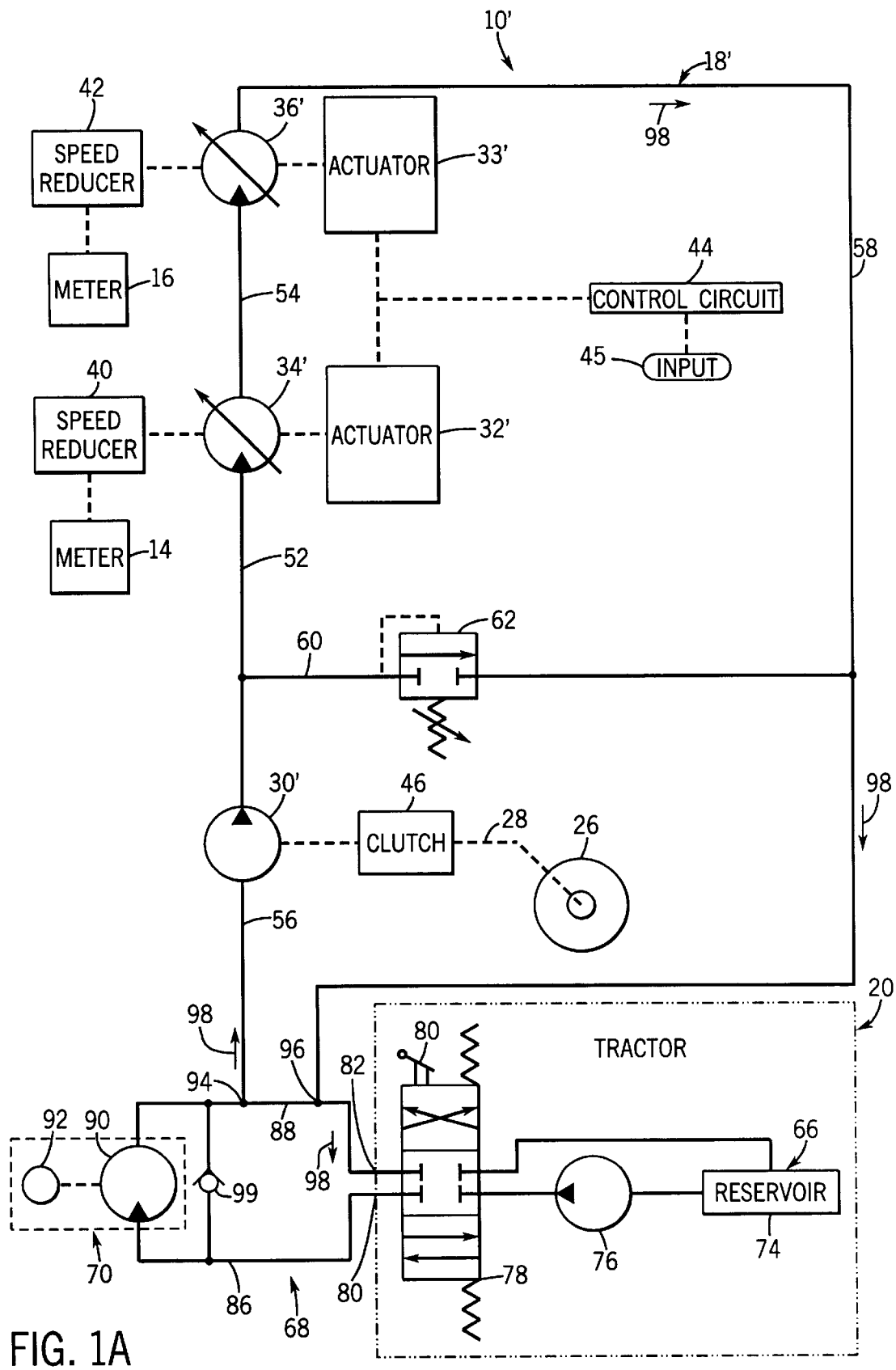
FIG. 1A is a schematic illustration of a first alternative embodiment of the agricultural material metering system of FIG. 1.

FIG. 1A illustrates an alternative metering system 10' including drive system 18', an alternative embodiment of drive system 18. For ease of illustration, those components of metering system 10' which are similar to corresponding components of metering system 10 are numbered similarly. Metering system 10' and drive system 18' are substantially identical to metering system 10 and drive system 18 except that drive system 18' includes pump 30' instead of pump 30, actuators 34' and 36' instead of actuators 34 and 36 and actuators 32' and 33' instead of actuator 32. Pump 30' is similar to pump 30 except that pump 30' comprises a single displacement fluid pump rather than a variable displacement fluid pump. Actuators 34' and 36' are similar to actuators 34 and 36 except that actuators 34' and 36' comprise variable output actuators such that the rotational velocity at which actuators 34' and 36' drive speed reducers 40 and 42 and meters 14 and 16, respectively, may be controllably adjusted. In the exemplary embodiment shown in FIG. 1A, each of actuators 34' and 36' comprises a conventionally known variable displacement hydraulic motor having a swash block which is adjustable to vary the rotational velocity at which the motor drives an output shaft.

Actuators 32' and 33' are coupled to actuators 34' and 36', respectively, and are configured to move or actuate actuators 34' and 36', respectively, between at least a first position in which actuators 34' and 36' drive meters 14 and 16 at a first rate and a second position in which actuators 34' and 36' drive meters 14 and 16, respectively, at a second rate. In the exemplary embodiment, actuators 32' and 33' each comprise an electric motor configured to angularly rotate and reposition the swash plate in actuators 34' and 36', preferably by screw controls. This arrangement is similar to that shown and described with respect to FIGS. 6 and 7 hereafter, except that the output shaft 182 is coupled to the speed reducer and the meter. Actuators 32' and 33' are each connected to control circuit 44 and input 45 preferably coupled to controls at an operator station of a tractor. As a result, the rates at which actuators 34' and 36' drive meters 14 and 16 may be varied to vary the rate at which agricultural material is metered. In contrast to metering system 10, metering system 10' allows the rate at which meters 14 and 16 meter agricultural material to be varied relative to one another by individually varying the rates at which actuators 34' and 36' drive meters 14 and 16.

Figure 1B:
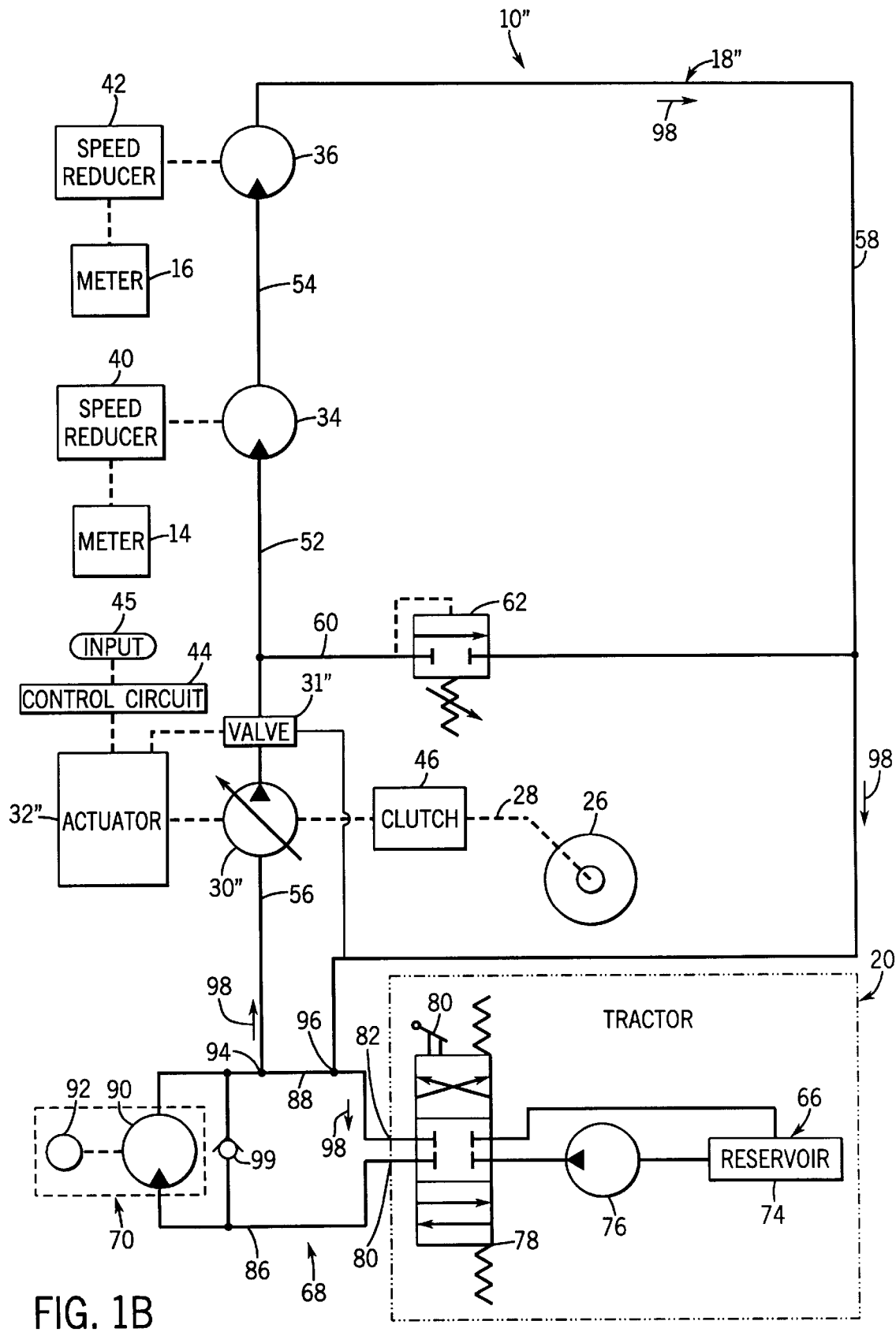
FIG. 1B is a schematic illustration of the second alternative embodiment of the agricultural material metering system of FIG. 1.

FIG. 1B illustrates metering system 10" including drive system 18", a second alternative embodiments of drive system 18. Once again, for purposes of illustration, those elements of metering system 10" and drive system 18" which are similar to corresponding elements of metering system 10 and drive system 18 are numbered similarly. Metering system 10" and drive system 18" are similar to metering system 10 and drive system 18 except that metering system 10" and drive system 18" include pump 30" and valve 31" in lieu of pump 30 and include actuator 32" in lieu of actuator 32. Pump 30" is similar to pump 30 except that pump 30" comprises a single displacement hydraulic pump. Valve 31" comprises a conventionally known valve mechanism fluidly coupled within hydraulic line 52 between pump 30" and actuator 34. Valve 31" is configured to adjust or vary the amount or percentage of pressurized fluid displaced by pump 30 which is transmitted to actuators 34 and 36 and the remaining amount or percentage of displaced hydraulic fluid which is diverted for other uses or returned back to hydraulic source 20. Actuator 32" is coupled to valve 31" and is configured to move valve 31" between a first position in which a first amount of pressurized fluid displaced by pump 30" is transmitted to actuators 34 and 36 and a second position in which a second amount of pressurized fluid displaced by pump 30" is transmitted to actuators 34 and 36 to thereby adjust the rate at which actuators 34 and 36 drive meters 14 and 16, respectively. Actuator 32" is preferably coupled to and controlled by control circuit 44 and input 45 having operator controls located at an operator station of a tractor, such as in the cab of a tractor. In the exemplary embodiment, valve 31" includes a spool assembly and actuator 32' includes an electric solenoid configured to move the spool assembly of valve 31" between various states. The spool assembly is preferably oscillated between positions to provide non-discrete, smooth and continuous rate adjustment.

Although drive systems 18, 18' and 18" may be supplied with hydraulic fluid from various hydraulic sources such as an additional independent hydraulic system with an additional hydraulic reservoir, or an additional hydraulic circuit hydraulically connected to the hydraulics system (i.e., the reservoir and pump) of the work vehicle or tractor, drive systems 18, 18' and 18" are preferably supplied with hydraulic fluid from hydraulic source 20. Hydraulic source 20 generally includes hydraulic supply system 66, hydraulic circuit 68 and hydraulically driven component 70. Hydraulic supply system 66 generally includes reservoir 74, pump 76 and valve 78. Reservoir 74, pump 76 and valve 78 are conventionally known hydraulic components. Reservoir 74 contains a supply of hydraulic fluid which is drawn upon by pump 76. Pump 76 displaces the fluid under pressure to valve 78. Valve 78 is actuated by means of control 80 and supplies the pressurized hydraulic fluid to circuit 68 through supply port 80. Hydraulic fluid from circuit 68 is returned to reservoir 74 through return port 82. Supply port 80 and return port 82 preferably comprise conventionally known quick disconnect couplers configured to be releasably attached to hydraulic hoses. In the exemplary embodiment, hydraulic supply system 66 is provided as part of a tractor or other work vehicle.

Hydraulic circuit 68 comprises a plurality of hydraulic lines or passages connected to hydraulic supply system 66 and configured to transmit hydraulic fluid under pressure from supply port 80 to hydraulically driven component 70 and to further return the hydraulic fluid to return port 82 of supply system 66. In the exemplary embodiment, circuit 68 includes a supply portion 86 preferably coupled to pump 76 to supply pressurized fluid to component 70 and a return portion 88 configured to be connected to the component and fluidly coupled to reservoir 74 to return fluid from component 70 to reservoir 74.

Hydraulically driven component 70 is fluidly connected between supply portion 86 and return portion 88 of circuit 68 and comprises a component configured for being hydraulically powered. In the exemplary embodiment, component 70 is configured to be rotatable driven under hydraulic power. To this end, component 70 includes hydraulically driven rotary actuator 90 and rotatably driven component 92. In response to being supplied with pressurized hydraulic fluid by circuit 68, rotary actuator 90 rotatably drives component 92 in a desired fashion. After powering actuator 90 and driven component 92, the hydraulic fluid returns through return portion 88 to reservoir 74 of supply system 66. However, as shown by FIG. 1, prior to being returned to reservoir 74 of supply system 66, the returning hydraulic fluid, which is under relatively low pressure, is partially diverted and drawn through hydraulic line 56 to supply pump 30 with hydraulic fluid for drive system 18. In particular, returning hydraulic fluid is diverted at point 94 into line 56. After the hydraulic fluid is pumped through actuators 34 and 36, the hydraulic fluid is returned via line 58 to point 96 where the hydraulic fluid once again returns to return portion 88 to be directed back to reservoir 74 as indicated by arrows 98. To ensure that the hydraulic fluid being supplied to pump 30 through line 56 has adequate pressure, circuit 68 includes an additional make-up check valve 99 fluidly coupled between supply portion 86 and return portion 88 of circuit 68.

In a first embodiment, rotatably driven component 92 comprises a fan or blower employed as part of metering system 10. In particular, in one embodiment where meters 14, 16 each include a rotatable metering member comprising a drum, the blower or fan is used to pressurize the interior of the drum. In a second embodiment where meters 14, 16 include a rotatable metering member comprising a plate, the fan or blower is used to create a vacuum on one side of the plate. In a third embodiment where meters 14, 16 include a flute, the fan or blower is used to deliver the seed or agricultural material from the flute to a secondary meter and/or material delivery tube.

Hydraulic source 20 further enables metering system 10 to more accurately and economically meter agricultural material. Because hydraulic source 20, supplying hydraulic fluid to drive system 18, preferably further includes the existing reservoir 74 of the work vehicle or tractor carrying, pulling or pushing the implement supporting meters 14, 16, system 10 does not require an additional independent hydraulic system with an additional hydraulic reservoir. Because drive system 18 utilizes the generally low pressure hydraulic fluid returning to reservoir 74 from component 70 via return portion 88 to circuit 68, drive system 18 does not increase the hydraulic requirements of supply system 66 or of the work vehicle or tractor including supply system 66. In addition, because drive system 18 utilizes low pressure oil returning to reservoir 74, the hydraulic fluid being displaced by pump 30 to drive actuators 34, 36 and meters 14, 16 has a more consistent temperature and viscosity. As a result, system 10 achieves better metering consistency and reliability. Moreover, because drive systems 18, 18' and 18" preferably utilize hydraulic fluid from a pre-existing hydraulic circuit and hydraulically driven component, drive systems 18, 18' and 18" may be more easily adapted to pre-existing implements.

Figure 2:
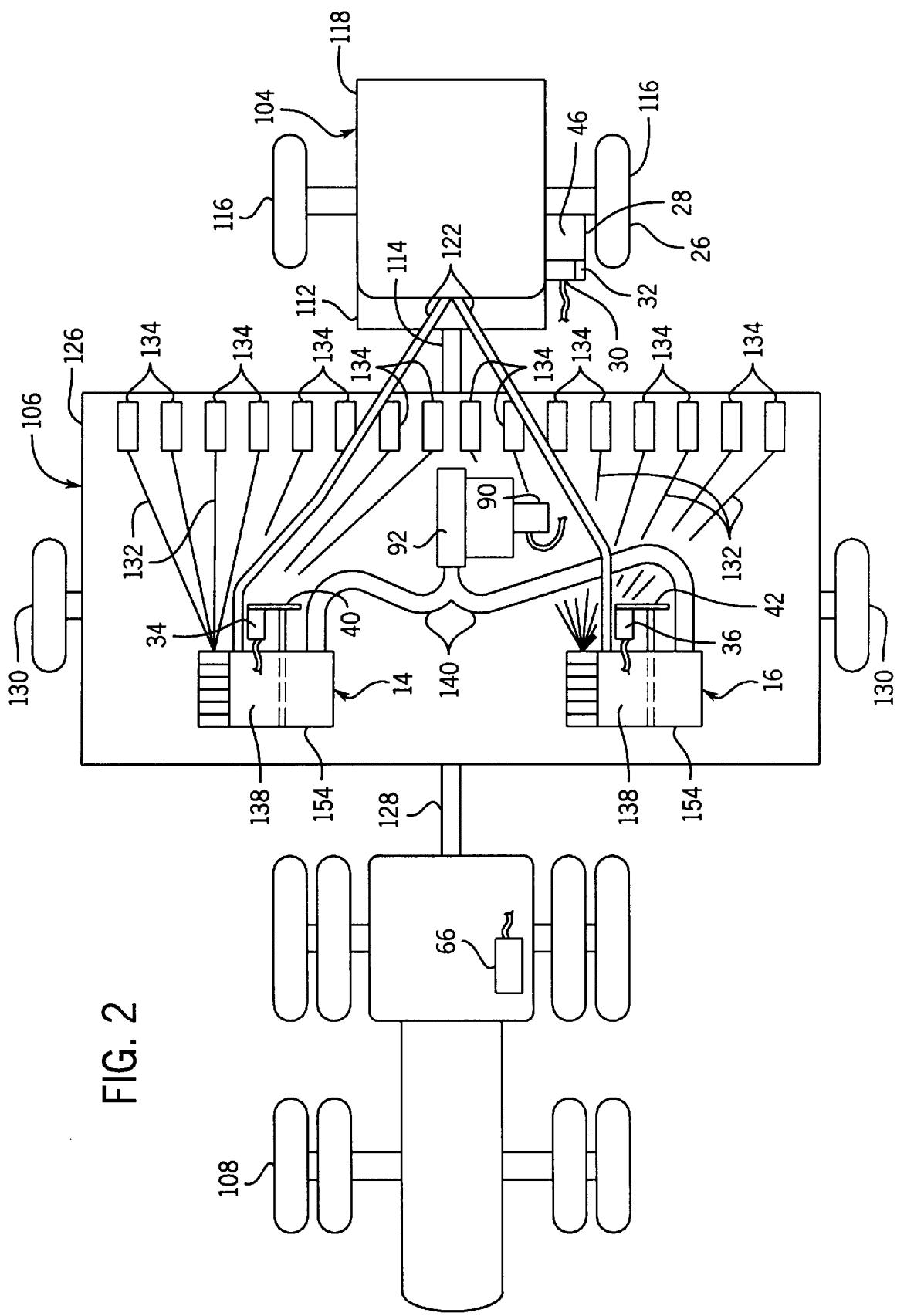
FIG. 2 is a top pictorial view of a tractor, planting implement and cart incorporating the agricultural material metering system of FIG. 1.

FIGS. 2–7 illustrate an exemplary embodiment of material metering system 10 configured to be used as part of cart 104 and planting implement 106 which are pulled behind tractor 108. FIG. 2 is a top perspective view of tractor 108 pulling planting implement 106 and cart 104. Cart 104, planting implement 106, and tractor 108 each support and include exemplary components of metering system 10 described with respect to FIG. 1. In particular, cart 104 incorporates transmission 28, including clutch 46, pump 30 and actuator 32. Implement 106 incorporates hydraulically driven rotary actuators 34, 36, speed reducers 40, 42, actuator 90 and hydraulically driven component 92. Tractor 108 incorporates hydraulic supply system 66. Although each of the components of system 10 shown in FIG. 2 are fluidly or mechanically connected as shown in FIG. 1, the fluid lines and linkages have been substantially omitted in FIG. 2 for illustration purposes.

In addition to incorporating components of metering system 10, cart 104 includes frame or undercarriage 112 including tongue 114, wheels 116, material bin 118, metering mechanism (not shown) and seed supply tubes 122. Undercarriage 112, tongue 114 and wheels 116 provide a chassis for supporting the remainder of cart 104. Tongue 114 extends from undercarriage 112 and is configured for connecting cart 104 to seeding or planting implement 106. In the exemplary embodiment, one of wheels 116 also serves as the ground driven member 26. Alternatively, cart 104 may be provided with an additional wheel serving as ground driven member 26.

Bin 118 comprises a large hopper configured to contain agricultural seed and to channel the seed, usually by the force of gravity, to the metering mechanism (not shown). The metering mechanism then meters the agricultural seed to seed supply tubes 122. In the exemplary embodiment, the metering mechanism includes a slidable gate and a flute which, upon being rotated, delivers seed to seed supply tubes 122. Seed delivery tubes 122 are generally elongate hoses or passages through which the seed is moved, usually with the assistance of pressurized air, to the interior of meters 14, 16 carried by implement 106. Although the metering mechanism and seed supply tubes 122 may have various well known configurations, the metering mechanism and seed supply tubes 122 are preferably configured as shown and described in co-pending U.S. patent application Ser. No. 08/920,785, filed on Aug. 29, 1997, and entitled "Pneumatic Seed Delivery System", the full disclosure of which is hereby incorporated by reference.

Seeding or planting implement 106 additionally includes frame or tool bar 126, tongue 128, wheels 130, seed delivery tubes 132 and row units 134. Frame or tool bar 126, tongue 128 and wheels 130 form the chassis of implement 106. Tongue 128 extends forward from tool bar 126 and is configured to be connected to tractor 108. Wheels 130 support tool bar 126 above the ground or terrain. In addition to supporting the components of seed metering system 10, tool bar 126 also supports seed delivery tubes 132 and row units 134.

Seed delivery tubes 132 comprise elongate tubes configured and sized to channel and direct metered seed from meters 14 and 16 to each of row units 134. Row units 134 are supported at spaced apart intervals by tool bar 126 and are conventionally known. Each row unit 134 is generally configured to create a furrow in the ground such that metered seed can be deposited within the furrow, to cover the deposited seed with soil and to preferably compact the soil over the seed.

Alternatively, row units 134 may be configured to drill the seed into the soil. In addition, row units 134 may additionally be configured to form various other functions such as depositing fertilizer underneath the ground. As will be appreciated, the exact configuration and spacing of row units 134 will vary depending upon the growing conditions, the type of seed being planted and the desired row spacing of the seeds.

During planting, tractor 108 pulls implement 106 and cart 104 across the field. As cart 104 is pulled across the field, cart 104 supplies seed to interiors 138 of meters 14 and 16. Hydraulic supply system 66 of tractor 108 supplies pressurized hydraulic fluid to actuator 90 which drives driven component 92, preferably a blower or fan, which pressurizes interiors 38 of meters 14, 16 via air supply hoses or tubes 140. As cart 104 is pulled across the field, ground driven member 26 rotates at a speed proportional to a rate at which cart 104 and implement 106 are being pulled by tractor 108. Ground driven member 26 transmits torque via transmission 28 to pump 30. As previously noted, the transmission of torque to pump 30 may be interrupted by disengaging clutch 46. In addition, the rate at which pump 30 displaces fluid may be adjusted on the go by actuator 32.

The fluid displaced by pump 30 drives rotary actuators 34 and 36, which through speed reducers 40 and 42, rotatably drive meters 14 and 16, respectively. After rotatably driving actuators 34 and 36, the hydraulic fluid is returned to reservoir 74 (shown in FIG. 1) of power supply system 66 of tractor 108.

FIGS. 3 and 4 illustrate actuator 34, speed reducer 40, meter 14, seed supply tube 122, air supply tube 140 and seed delivery tubes 132 in greater detail. As shown by FIG. 3, meter 14 includes support plate 150, frame 152, drum 154, shaft 156 and rollers 158. Plate 150 extends along an open end of drum 154 and includes multiple openings through which seed supply tube 122, air supply tube 140 and seed delivery tubes 132 communicate with interior 138 of drum 154. Plate 150 is supported by tool bar 126 (shown as FIG. 2) and supports drum 154 and shaft 156 in addition to seed supply tube 122, air supply tube 140 and seed delivery tubes 132.

Frame 152 extends from tool bar 126 and supports actuator 34 and speed reducer 42 relative to shaft 156. In the exemplary embodiment, frame 152 serves as an enclosure about drum 154, shaft 156 and rollers 158. As will be appreciated, frame 152 as well as plate 150 may have a variety of alternative shapes and configurations. Moreover, frame 152 and plate 150 may be integrally formed as part of tool bar 126.

Drum 154 comprises a generally cylindrical drum having interior 38 and perforation rows 160 along its circumferential wall. Drum 154 is secured to shaft 156 in sealing contact with plate 150.

Shaft 156 extends through plate 150 and has one end secured to drum 154 and another end engaged with speed reducer 42. As a result, actuator 34 drives speed reducer 42 which, in turn, rotatably drives shaft 156 to rotate drum 154.

Rollers 158 are rotatably supported in contact with an outer circumferential surface of drum 154 adjacent to perforation rows 160 above inlets 164 of seed delivery tubes 132. Rollers 158 are configured to close off individual perforations of perforation rows 160 above inlets 164.

During planting, seed flows through seed supply tube 122 and enters interior 138 as indicated by arrows 166. At the same time, air supplied by component 92, comprising a fan or blower (shown in FIG. 2), enters interior 138 through air supply tube 140 as indicated by arrow 168. The air pressure within interior 138 causes the seeds to be drawn into the individual perforations of perforation rows 160. Rotation of drum 154 by actuator 34, speed reducer 42 and shaft 156 carries the seeds captured within the perforations. Once the seeds are positioned above inlets 164, rollers 158 close off the perforations such that the seeds fall into inlet 64 for delivery to the growing medium by seed delivery tubes 132. As noted above, meter 14 may have various other alternative configurations depending upon the particular type and size of agricultural material being delivered, the desired metering precision and whether the meter comprises a drum, plate, flute or other rotatable metering member.

Figure 5:
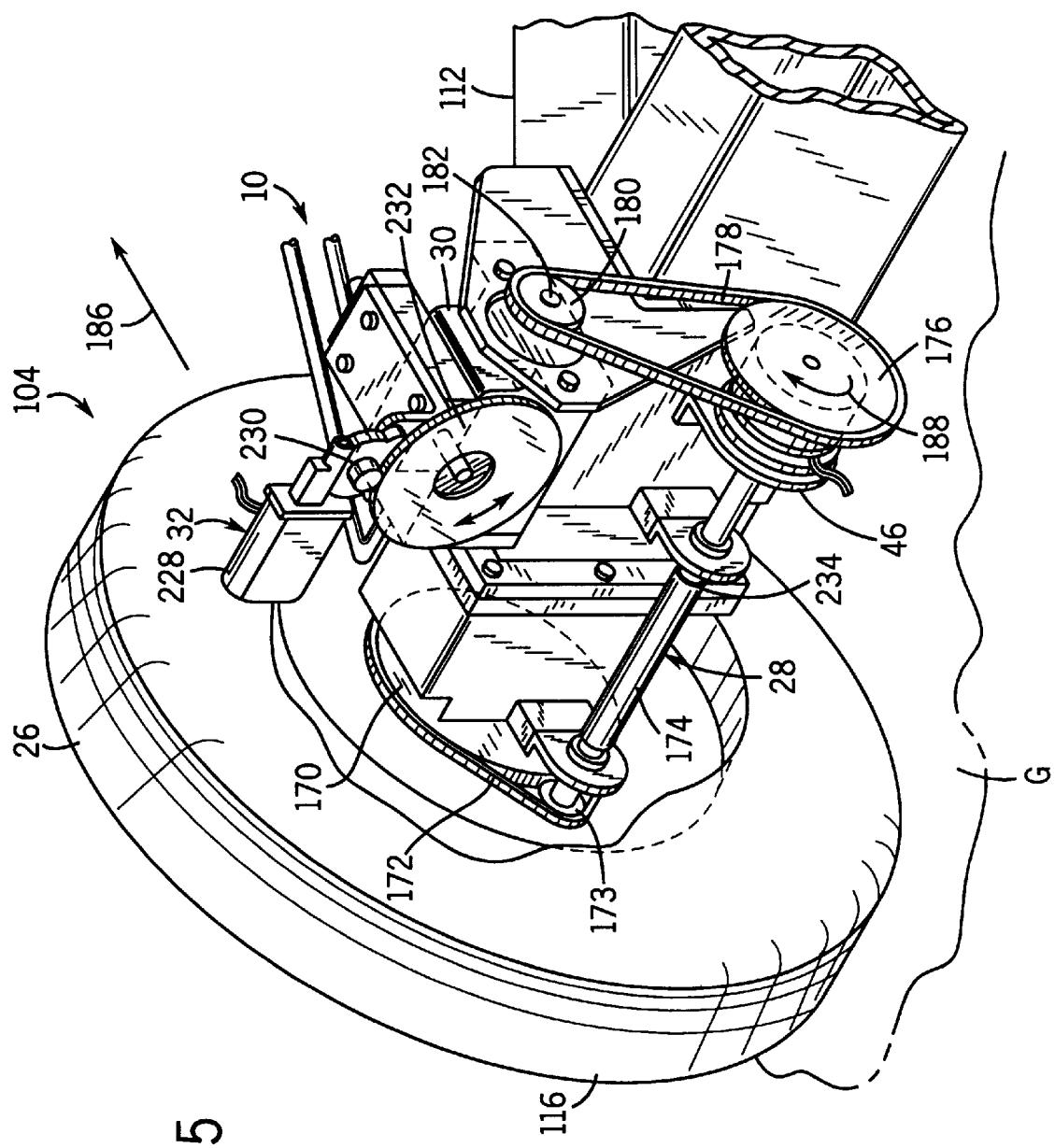
FIG. 5 is a fragmentary top perspective view of an exemplary embodiment of the drive system of the material metering system of FIG. 2.

FIG. 5 illustrates ground-driven member 26, transmission 28 including clutch 46, pump 30 and actuator 32 in greater detail. In the exemplary embodiment, ground-driven member 26 comprises one of wheels 116 supporting undercarriage 112 above ground G. Ground-driven member 26 is rotatably supported in engagement with the ground by undercarriage 112. Undercarriage 112 further supports transmission 28, pump 30 and actuator 32 in close proximity to ground-driven member 26.

As shown by FIG. 5, transmission 28 generally includes sprocket 170, chain 172, shaft 174, sprocket 176, chain 178 and sprocket 180. Sprocket 170 is coupled to ground-driven member 26 for rotation with ground-driven member 26. Sprocket 173 is fixed to shaft 174. Chain 172 extends between and interconnects sprockets 170 and 173 to transmit torque from sprocket 172, sprocket 173 and shaft 174.

Shaft 174 is rotatably supported adjacent to undercarriage 112 and extends from sprocket 173 to clutch 46. Clutch 46 comprises a conventionally known electric clutch which is actuated in a conventionally known manner between engaged and disengaged positions. In the engaged position, clutch 46 transmits torque from shaft 174 to sprocket 176. In the disengaged position, clutch 46 interrupts the transmission of torque from shaft 174 to sprocket 176. Sprocket 176 is coupled to clutch 46 and shaft 174. Sprocket 180 is secured to drive shaft 182 of pump 30. Chain 178 extends between and interconnects sprockets 176 and 178 to transmit torque therebetween. As cart 104 is pulled in the direction indicated by arrow 186, ground-driven member 26 is pulled across ground G to rotatably drive shaft 174 which in turn rotatably drives sprocket 176 in the direction indicated by arrow 188 when clutch 46 is engaged. As a result, sprocket 176 drives sprocket 180 via chain 178 to drive pump 30 such that pump 30 displaces hydraulic fluid at a rate proportional to the rate at which cart 104 is pulled across ground G.

Figure 6:
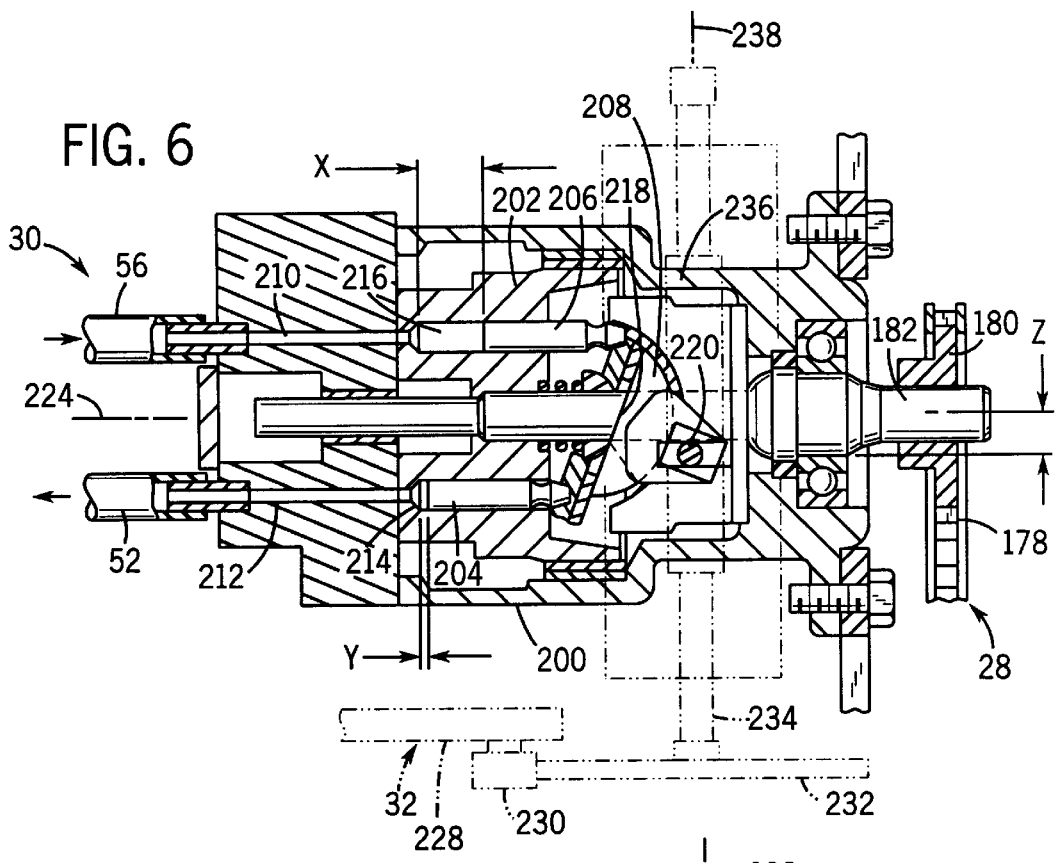
FIG. 6 is a sectional view of an actuator of the agricultural material metering system displacing fluid at a first rate.
Figure 7:
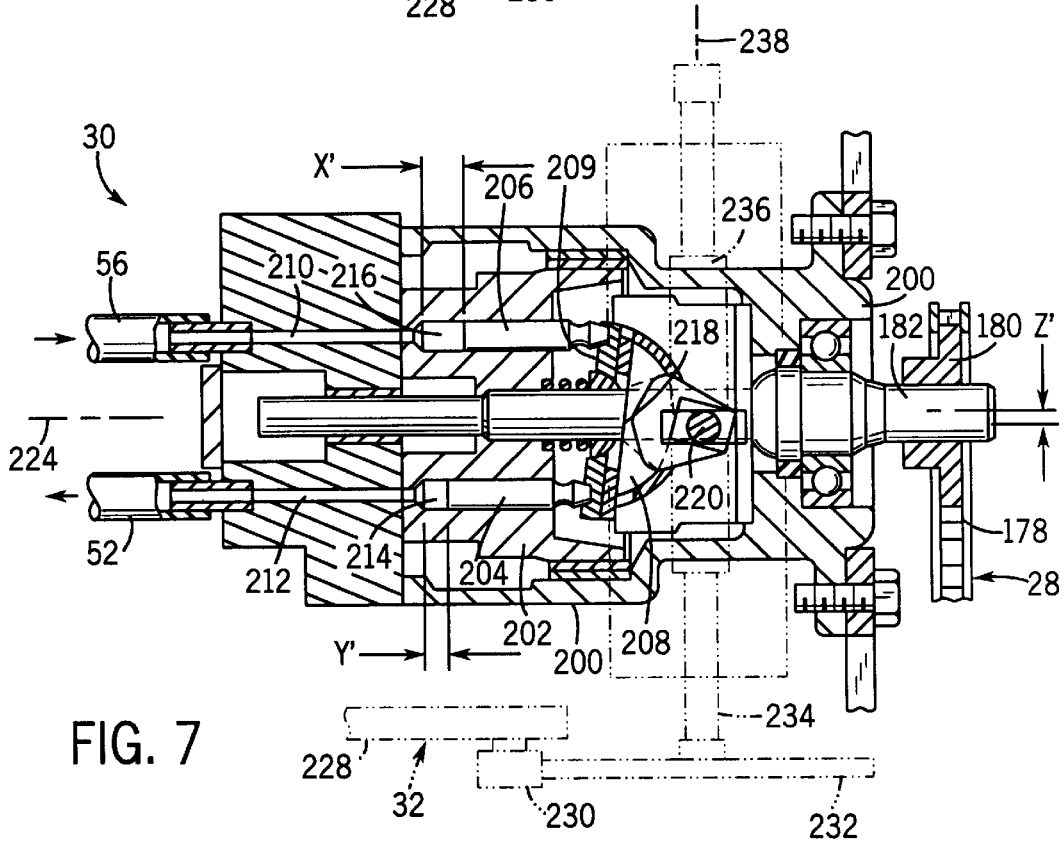
FIG. 7 is a sectional view of the actuator of FIG. 6 displacing fluid at a second rate.

Pump 30 and actuator 32 are illustrated in greater detail in FIGS. 6 and 7. As shown by FIGS. 6 and 7, pump 30 comprises an axial piston type pump of general conventionally known design generally including housing 200, rotatable barrel 202, pistons 204, 206 and swash plate or swash block 208. Housing 200 includes inlet passage 210 and outlet passage 212 which are fluidly coupled to hydraulic lines 56 and 52, respectively. Barrel 202 includes cylindrical bores 214, 216 which receive pistons 204 and 206, respectively. Barrel 202 is rotatably disposed within housing 200 and is fixedly secured to input shaft 182 which is secured to sprocket 180 of transmission 28. Swash block 208, also known as a thrust plate is secured to housing 200 adjacent to pistons 204 and 206, and includes a face 209 that engages pistons 204 and 206 to vary the amount of reciprocal stroking movement imparted to pistons 204 and 206 as barrel 202 is rotatably driven by input shaft 182. Swash block 208 is rotatably supported about an axis 218 and includes a control rod or pin 220 configured to enable swash block 208 to be rotated about axis 218.

In operation, transmission 28 rotatably drives input shaft 182 and barrel 202 about axis 224 relative to housing 200 and swash block 208. Pistons 204, 206 reciprocate within bores 214, 216, respectively, whereby bores 214 and 216 are expanded when registered with inlet passage 210 and compressed when registered with outlet passage 212, resulting in fluid being drawn into barrel 202 through inlet passage 210 and expelled from barrel 202 through outlet passage 212. The amount of fluid drawn through inlet passage 210 into barrel 202 and expelled from barrel 202 out outlet passage 212 is variable depending upon the inclination of swash block 208 relative to barrel 202 and pistons 204, 206.

Actuator 32 (shown in phantom) selectively varies the inclination of swash block 208 to vary the rate at which pump 30 displaces hydraulic fluid to vary the rate at which agricultural material is metered. In the exemplary embodiment, actuator 32 includes electric motor 228, speed reducing gears 230, 232, shaft 234 and screw control 236. Motor 228 includes an output shaft affixed to gear 230 whereby motor 228 rotatably drives gear 230. Gear 230 includes outer circumferential teeth in meshing engagement with the outer circumferential teeth of gear 232 which preferably has a larger diameter such that gears 230 and 232 provide speed reduction. Gear 232 is fixed to shaft 234 which supports screw control 236 in engagement with control pin 220. Screw control 236, also known as a worm gear or a threaded gear, at least partially receives at least a portion of control pin 220 such that rotation of screw control 236 about axis 238 linearly moves pin 220 along axis 238 to rotate swash block 208 about axis 218.

FIGS. 6 and 7 illustrate actuator 32 actuating pump 30 between a first position (shown in FIG. 6) in which pump 30 displaces fluid to hydraulic line 52 at a first rate and a second position (shown in FIG. 7) in which pump 30 displaces hydraulic fluid through hydraulic line 52 at a second reduced rate. In particular, in FIG. 6, control pin 220 is displaced by a distance Z from axis 224 such that bores 214 and 216 are expanded by a distance X when registered with inlet passage 210 and are compressed to a distance Y when registered with outlet passage 212. FIG. 7 illustrates control pin 220 linearly moved along axis 238 such that control pin 220 is offset from axis 224 by a smaller distance Z', whereby swash block 208 is rotated about axis 218. As a result, face 209 of swash block 208 extends almost perpendicular to axis 224 such that bores 214 and 216 are expanded by a smaller distance X' when registered with inlet passage 210 and are compressed by a larger distance Y' when registered with outlet passage 212. As a result, pistons 204 and 206 displace less hydraulic fluid to hydraulic line 52 per revolution of barrel 202 by transmission 28.

In the exemplary embodiment illustrated in FIGS. 2–7 wherein metering system 10 is depicted as having ground-driven member 26, transmission 28, pump 30 and actuator 32 configured as part of cart 104 and in which actuators 34, 36, speed reducers 40, 42 and meters 14, 16 are configured as part of seeding implement 106 which meters seed in rotatable Cyclo drums, the following specifications and parameters are presently preferred. It is desirable that the hydraulic fluid within return portion 88 of circuit 68 has a pre-charge of approximately 200 p.s.i. Variable displacement pump 30 preferably comprises a hydraulic piston pump configured to displace 22.7 liters per minute at 1800 RPM. Pump 30 preferably comprises an axial displacement piston pump manufactured by the Oil Gear Company of Milwaukee, Wis. and assigned product No. PVWH-06-RSAB-HN-L50589. Pressure relief valve 62 is preferably configured to limit pressure within line 52 to approximately 1600 psi. Actuators 34 and 36 preferably comprise 1.93 cubic inch hydraulic motors which have a maximum speed of 166 RPM. Speed reducers 40 and 42 preferably have a 5 to 1 gear ratio such that drums 154 of meters 14 and 16 are rotated at a maximum of 33 RPM. Actuator 32 preferably comprises a 12-volt DC electric motor known as a window lift actuator configured to generate 1.8 Newton meters of torque and rotating at a velocity of 22–50 RPM. As will be appreciated, each of the parameters and specifications will vary depending upon multiple factors such as the type of agricultural material meters being driven, the selected range of seed populations or the expected ranges of application rates for the seed, fertilizer, insecticide or herbicide, the expected pressure of the hydraulic fluid returning from the hydraulically driven component and various other factors.

Although ground-driven member 26, transmission 28, pump 30 and actuator 32 have been illustrated as being configured as part of a separately pulled implement carrying a supply of agricultural material (cart 104) pulled behind an implement supporting meters 14, 16 (seeding implement 106), each of these components may alternatively be directly mounted upon the implement supporting meters 14, 16. Moreover, although meters 14, 16 are illustrated as being supplied with seed from a separate seed cart 104 pulled behind seed implement 106, meters 14, 16 may alternatively be supplied with agricultural material from a single hopper, tank or bin supported by tool bar 126 and supplying material to each of meters 14, 16 or may be supplied with material from independent dedicated hoppers, tanks or bins supported by tool bar 126. Although one exemplary embodiment has been illustrated, it is contemplated that agricultural material metering system 10 may be configured and alternatively employed to meter various kinds of agricultural material, may be configured to drive various differently configured meters and may be configured to utilize various alternative hydraulic sources. For example, although drive system 18 has been illustrated as including rotary actuators 34 and 36 for rotatably driving rotatable metering members of meters 14 and 16, respectively, drive system 18 may alternatively be configured to include alternative non-rotary hydraulic actuators which reciprocate or otherwise drive metering members of alternative agricultural material metering mechanisms.

Although the present invention has been described with reference to preferred embodiments, workers skilled in the art will recognize that changes may be made in form and detail without departing from the spirit and scope of the invention. Because the technology of the present invention is relatively complex, not all changes in the technology are foreseeable. The present invention described with reference to the preferred embodiments and set forth in the following claims is manifestly intended to be as broad as possible. For example, unless specifically otherwise noted, the claims reciting a single particular element also encompass a plurality of such particular elements.

What is claimed is:

1. An agricultural material metering system comprising:
   a rotatable metering member configured to meter agricultural material upon being rotated;
   a hydraulically driven rotary actuator coupled to the metering member to rotate the metering member;
   a variable displacement pump adapted to be fluidly coupled between a source of hydraulic fluid and the rotary actuator, wherein the pump is actuatable between a first position in which the pump displaces fluid at a first rate and a second position in which the pump displaces fluid at a second rate;
   a rotatable ground driven member coupled to the pump to drive the pump when rotating; and
   an actuator coupled to the variable displacement pump and configured to actuate the variable displacement pump between the first and second positions to vary rotational velocity of the rotary actuator, to vary rotational velocity of the metering member and to vary rates at which material is metered.

2. The system of claim 1 wherein the rotatable metering member comprises a drum.

3. The system of claim 1 wherein the rotatable metering member comprises a flute.

4. The system of claim 1 wherein the rotatable metering member comprises a plate.

5. The system of claim 1 wherein the hydraulically driven rotary actuator comprises a hydraulic motor.

6. The system of claim 1 wherein the variable displacement pump comprises a variable displacement piston pump.

7. The system of claim 1 wherein the variable displacement pump includes a swash plate and a screw control for varying an angle of the swash plate to vary displacement rates and wherein the actuator comprises a second rotary actuator configured to rotate the screw control.

8. The system of claim 7 wherein the second rotary actuator comprises a motor.

9. The system of claim 1 including a clutch configured to selectively connect and disconnect the rotatable ground driven member and the first pump.

10. The system of claim 1 wherein the rotatable ground driven member comprises a wheel.

11. The system of claim 1 wherein the source of hydraulic fluid includes:
   a hydraulic reservoir;
   a second hydraulic pump;
   a hydraulic fluid circuit having a first portion extending from the reservoir to the pump and a second portion extending from the pump to the reservoir; and
   a hydraulically driven component coupled to the second portion of the circuit, wherein the variable displacement pump is fluidly connected to the second portion of the circuit.

12. The system of claim 11 wherein the variable displacement pump is fluidly coupled to the second portion of the circuit between the hydraulically driven component and the reservoir.

13. The system of claim 11 wherein the hydraulically driven component includes:
   a hydraulically driven rotary actuator; and
   a fan coupled to the rotary actuator.

14. The system of claim 13 including a rotatable ground driven motor coupled to the pump to drive the pump when rotating.

15. The system of claim 11 including:
   a second hydraulically driven rotary actuator fluidly coupled to the second portion of the circuit between the first hydraulically driven rotary actuator and the reservoir; and
   a second rotatable metering member coupled to the second rotary actuator and configured to meter agricultural material upon being rotated by the second rotary actuator.

16. The system of claim 1 including:
   a second hydraulically driven rotary actuator fluidly coupled to the variable displacement pump; and
   a second rotatable metering member coupled to the second rotary actuator and configured to meter agricultural material upon being rotated by the second rotary actuator.

17. An agricultural material metering system comprising:
   a hydraulic reservoir;
   a first hydraulic pump;
   a hydraulic circuit having a first portion extending from the reservoir to the pump and a second portion extending from the pump to the reservoir;
   a hydraulically driven component coupled to the second portion of the circuit;
   a second pump coupled to the second portion of the circuit;
   a first hydraulically driven rotary actuator fluidly coupled to the second pump to receive fluid displaced by the second pump; and
   a first rotatable metering member coupled to the rotary actuator and configured to meter agricultural material upon being rotated by the first hydraulically driven rotary actuator.

18. The system of claim 17 wherein the second pump is coupled to the second portion of the hydraulic circuit between the hydraulically driven component and the reservoir.

19. The system of claim 17 wherein the rotatable metering member includes a drum.

20. The system of claim 17 wherein the rotatable metering member includes a flute.

21. The system of claim 17 wherein the rotatable metering member includes plate.

22. The system of claim 17 wherein the hydraulically driven rotary actuator comprises a hydraulic motor.

23. The system of claim 17 wherein the second pump comprises a variable displacement pump, wherein the pump is actuatable between a first position in which the pump displaces fluid at a first rate and a second position in which the pump displaces fluid at a second rate.

24. The system of claim 23 wherein the variable displacement pump comprises a variable displacement piston pump.

25. The system of claim 23 wherein the variable displacement pump includes a swash plate and a screw control for varying an angle of the swash plate to vary displacement rates and wherein the actuator comprises a rotary actuator configured to rotate the screw control.

26. The system of claim 25 wherein the rotary actuator comprises a motor.

27. The system of claim 25 including a clutch configured to selectively connect and disconnect the rotatable ground driven member and the pump.

28. The system of claim 23 including a rotatable ground driven member coupled to the pump to drive the pump when rotating.

29. The system of claim 28 wherein the rotatable ground driven member comprises a wheel.

30. The system of claim 16 including:
   a second hydraulically driven rotary actuator fluidly coupled to the second portion of the circuit between the first hydraulically driven rotary actuator and the reservoir; and
   a second rotatable metering member coupled to the second rotary actuator and configured to meter agricultural material upon being rotated by the second rotary actuator.

31. An agricultural material metering system for use with an implement having a hydraulically driven component and a hydraulic circuit having a first supply portion connected to the component and adapted to be fluidly coupled to a first pump of a work vehicle and a second return portion connected to the component and adapted to be connected to a fluid reservoir of the work vehicle, the metering system comprising:
   a second pump adapted to be coupled to the second portion of the circuit;
   a first hydraulically driven rotary actuator fluidly coupled to the second pump to receive fluid displaced by the second pump; and
   a first rotatable metering member coupled to the first rotary actuator and configured to meter agricultural material upon being rotated by the first rotary actuator.

32. The system of claim 31 wherein the second pump is adapted to be coupled to the second portion of the circuit between the hydraulically driven component and the reservoir.

33. The system of claim 31 wherein the hydraulically driven component includes:
   a second hydraulically driven rotary actuator; and
   a fan coupled to the second hydraulically driven rotary actuator.

34. A material metering implement for use with a work vehicle having a fluid reservoir and a fluid pump, the material metering implement comprising:
   a frame;
   a plurality of ground engaging members supporting the frame above ground;

a rotatable metering member coupled to the frame and configured to meter agricultural material upon being rotated;

a hydraulically driven rotary actuator coupled to the metering member to rotate the metering member;

a variable displacement pump adapted to be fluidly coupled between a source of hydraulic fluid and the rotary actuator, wherein the pump is actuatable between a first position in which the pump displaces fluid at a first rate and a second position in which the pump displaces fluid at a second rate;

a rotatable ground driven member supported by the frame and coupled to the pump to drive the pump when rotating; and an actuator coupled to the variable displacement pump and configured to actuate the variable displacement pump between the first and second positions to vary the rotational velocity of the rotary actuator, to vary rotational velocity of the metering member and to vary rates at which material is metered by the metering member.

35. An agricultural material metering system comprising:

metering means for metering agricultural material upon being driven;

hydraulically driven actuator means for driving the metering means;

a fluid displacement pump having an inlet fluidly coupled to a source of hydraulic fluid and an outlet fluidly coupled to the hydraulically driven actuator means, wherein the pump displaces fluid upon being driven to drive the hydraulically driven actuator means;

a rotatable ground-driven member coupled to the pump to drive the pump when rotating;

variable drive control means coupled between the inlet of the pump and the metering means for actuation between a first position in which the hydraulically driven actuator means drives the metering means at a first rate and a second position in which the hydraulically driven actuator drives the metering means at a second rate; and an actuator coupled to the variable drive control means, wherein the actuator is configured to actuate the variable drive control means between the first and second positions to vary rates at which the material is metered by the metering means.

36. The metering system of claim 35 wherein the pump includes the variable drive control means such that the pump is actuatable between a first position in which the pump displaces fluid at a first rate to the hydraulically driven actuator means and a second position in which the pump displaces fluid at a second rate to the hydraulically driven actuator means.

37. The metering system of claim 35 wherein the hydraulically driven actuator means includes the variable drive control means such that the hydraulically driven actuator means is actuatable between a first position in which the hydraulically driven actuator means drives the metering means at a first rate per unit of hydraulic power received from the pump and a second position in which the hydraulically driven actuator drives the metering means at a second rate per unit of hydraulic power received from the pump.

38. The metering system of claim 35 wherein the variable drive control means includes a valve fluidly coupled between the fluid displacement pump and the hydraulically driven actuator means, wherein the valve is moveable between a first position in which the valve transmits a first percentage of fluid displaced by the pump to the hydraulically driven actuator means and a second position in which the valve transmits a second percentage of the fluid displaced by the pump to the hydraulically driven actuator means.

39. The metering system of claim 35 including a control circuit coupled to the actuator, wherein the control circuit generates a control signal based upon input and wherein the actuator actuates the variable drive control means in response to the control signal.

40. The metering system of claim 39 wherein the input is provided by an operator.

* * * * *